(12) United States Patent
Chen et al.

(10) Patent No.: US 9,278,333 B1
(45) Date of Patent: Mar. 8, 2016

(54) RUBBER FOAM OIL-ABSORBING MATERIAL AND PREPARATION METHOD THEREOF

(71) Applicant: Ningbo University, Ningbo (CN)

(72) Inventors: Zhongren Chen, Ningbo (CN); Yiping Ruan, Ningbo (CN); Wenchao Bi, Ningbo (CN)

(73) Assignee: Ningbo University, Ningbo (CN)

( * ) Notice: Subject to any disclaimer, the term of this patent is extended or adjusted under 35 U.S.C. 154(b) by 0 days.

(21) Appl. No.: 14/567,626

(22) Filed: Dec. 11, 2014

(30) Foreign Application Priority Data

Oct. 23, 2014 (CN) .......................... 2014 1 0571177

(51) Int. Cl.
| | | |
|---|---|---|
| B01J 20/26 | (2006.01) |
| B01J 20/24 | (2006.01) |
| B01J 20/22 | (2006.01) |
| B01J 20/06 | (2006.01) |
| B01J 20/02 | (2006.01) |
| B01J 20/30 | (2006.01) |
| B01J 20/28 | (2006.01) |
| C09K 3/32 | (2006.01) |

(52) U.S. Cl.
CPC ................ *B01J 20/261* (2013.01); *B01J 20/02* (2013.01); *B01J 20/06* (2013.01); *B01J 20/22* (2013.01); *B01J 20/24* (2013.01); *B01J 20/28045* (2013.01); *B01J 20/3007* (2013.01); *B01J 20/3021* (2013.01); *C09K 3/32* (2013.01)

(58) Field of Classification Search
CPC ............ B01J 20/02; B01J 20/06; B01J 20/22; B01J 20/24; B01J 20/28045; B01J 20/3007; B01J 20/3021; C09K 3/32
USPC ......................................................... 502/402
See application file for complete search history.

(56) References Cited

U.S. PATENT DOCUMENTS

| | | | | |
|---|---|---|---|---|
| 2010/0120933 A1* | 5/2010 | Imai | ...................... | C08F 210/06 521/140 |
| 2011/0287929 A1* | 11/2011 | Smith | ........................ | C08J 9/00 502/402 |

* cited by examiner

*Primary Examiner* — Colleen Dunn
*Assistant Examiner* — Haytham Soliman
(74) *Attorney, Agent, or Firm* — Wang Law Firm, Inc.

(57) ABSTRACT

A rubber foam oil-absorbing material and preparation method thereof, the rubber foam oil-absorbing material including: 100 parts of a mixture of natural rubber and butadiene rubber, 4-8 parts of N,N-dinitroso pentamethylene tetramine, 1-8 parts of 4,4'-oxydibenzenesulfonyl hydrazide, 1-6 parts of sodium bicarbonate, 0.3-0.8 part of diphenyl guanidine, 0.2-0.5 part of zinc dimethyl dithiocarbamate, 0.1-0.5 part of 2,2'-dithio-dibenzo thiazole, 0.1-0.3 part of tetramethyl thiuram disulfide, 3-5 parts of zinc oxide, 1-3 parts of stearic acid, and 0.5-1.5 parts of sulfur. The rubber foam oil-absorbing material uses the mixture of the natural rubber and butadiene rubber as the matrix, which is low in cost and has higher oil-absorption rate. The rate of oil-absorption from dimethylbenzene by the rubber foam oil-absorbing material can reach 48.6 g/g, and the rate of oil-absorption from dimethylbenzene is also above 30 g/g. The preparation method is simple and convenient to realize industrial production.

3 Claims, 1 Drawing Sheet

RUBBER FOAM OIL-ABSORBING MATERIAL AND PREPARATION METHOD THEREOF

RELATE APPLICATIONS

This application claims the benefit of Chinese Invention Application 201410571177.7, filed on Oct. 23, 2014, the specification of which is incorporated herein by this reference.

FIELD OF THE INVENTION

The present invention relates to the technical field of oil-absorbing materials, and specifically refers to a rubber foam oil-absorbing material and a preparation method thereof.

DESCRIPTION OF THE PRIOR ART

In recent years, as activities of the human beings increase dramatically, accidents such as oil leakage in the oil fields, leakage of the oil ship and breakage of oil transmission pipelines occur continuously. Emission of the oil-contained wastewater results in serious water pollution. At present, alleviation of the oil-contained wastewater pollution mainly depends on oil-absorbing materials. Oil-absorbing materials are usually classified into traditional oil-absorbing materials and high-efficiency oil-absorbing materials. The majority of domestic oil-absorbing materials are traditional oil-absorbing materials, for example, cornstalks, non-woven wool, kapok fibers, vermiculite, expandable graphite, zeolite, etc. However, traditional oil-absorbing materials mainly absorb the oil onto the material surfaces by physical absorption effect or through internal capillaries, and have the following defects:

(1) Small oil-absorption capability, low oil-absorption rate.

(2) The selectivity on oil and water is poor, and oil and water are usually absorbed at the same time.

(3) The oil preservation performance is poor after oil-absorption, and oil leaks again with a little force of extrusion.

The traditional oil-absorbing materials usually have the above problems, limiting their application in the oil-water mixing system, and thus failing to meet requirements for waste oil recycling and environmental protection. At present, high oil absorbing rate materials under research, serving as novel functional material, mainly include rubber oil-absorbing materials using rubber as the matrix and obtained through processing or polymerization, resin oil-absorbing materials using long-chain alkyl acrylate or olefin as monomers through polymerization and novel oil-absorbing materials made from carbon nanotubes and electrospun fibers. Those high oil absorbing rate materials usually have high oil-absorption capability, can process different solvents and oil substances, have lipophilicity and hydrophobicity, and do not absorb water when absorbing oil. Moreover, those materials are usually recyclable and have features of small density and flotation on the water surface.

For example, the literature Study on Preparation and Oil-absorbing Mechanism of Butadiene Styrene Rubber Oil-absorbing Material (Industrial Chemical. 2014 (6): 62-68.) describes an oil-absorbing material with high oil-absorption performance prepared by a molding and a free foaming method. This oil-absorbing material comprises the following components in weight: 100 parts of butadiene styrene rubber, 5 parts of zinc oxide, 5 parts of stearic acid, 2 parts of 2-benzothiazolethiol, 2 parts of N-cyclohexylbenzothiazole-2-sulphenamide, 0-0.8 part of dicumyl peroxide and 0-12 parts of azodicarbonamide. The oil-absorbing material prepared according to the above literature has can absorb dimethylbenzene and carbon tetrachloride well, and the maximum absorption rates respectively reach 45 g/g and 90 g/g. However, this oil-absorbing material uses the butadiene styrene rubber as the matrix, and the butadiene styrene rubber has defects such as low elasticity, poor processing property and low strength of raw rubber, resulting in poor entire performance of the prepared rubber foam oil-absorbing material and affecting the oil-absorbing rate and oil-absorbing speed.

Therefore, the current rubber foam oil-absorbing materials and preparation method thereof need further improvement.

SUMMARY OF THE INVENTION

It is the first object of the present invention to provide a rubber foam oil-absorbing material with low cost, a high oil-absorption rate, a high oil-absorption speed and high oil preservation performance.

It is the second object of the present invention to provide a method for preparing the rubber foam oil-absorbing material. The method is simple in process and is convenient to realize industrial production.

For achieving the above stated first object, a rubber foam oil-absorbing material, comprises the following components in weight:

100 parts of a mixture of natural rubber and butadiene rubber, 4-8 parts of N,N-dinitroso pentamethylene tetramine, 1-8 parts of 4,4'-oxydibenzenesulfonyl hydrazide, 1-6 parts of sodium bicarbonate, 0.3-0.8 part of diphenyl guanidine, 0.2-0.5 part of zinc dimethyl dithiocarbamate, 0.1-0.5 part of 2,2'-dithio-dibenzo thiazole, 0.1-0.3 part of tetramethyl thiuram disulfide, 3-5 parts of zinc oxide, 1-3 parts of stearic acid, and 0.5-1.5 parts of sulfur.

Preferably, the natural rubber accounts for 30%-90% of the weight of the mixture of the natural rubber and butadiene rubber.

To solve the second technical problem, the present invention employs the following technical solution: A method for preparing the rubber foam oil-absorbing material is provided, characterized by comprising following steps:

(1) Milling 100 parts of the mixture of the natural rubber and butadiene rubber in an open mill at a roll temperature of 50° C.~55° C. for 10 min-15 min, then sequentially adding 4-8 parts of N,N-dinitroso pentamethylene tetramine, 1-8 parts of 4,4'-oxydibenzenesulfonyl hydrazide, 1-6 parts of sodium bicarbonate, 0.3-0.8 parts of diphenyl guanidine, 0.2-0.5 parts of zinc dimethyl dithiocarbamate, 0.1-0.5 parts of 2,2'-dithio-dibenzo thiazole and 0.1-0.3 parts of tetramethyl thiuram disulfide, followed by milling for 3-5 min to obtain a Step 1 substance.

(2) Adding 3-5 parts of zinc oxide and 1-3 parts of stearic acid into the Step 1 substance, followed by milling for 3-5 min to obtain a Step 2 substance.

(3) Adding 0.5-1.5 parts of sulfur into the Step 2 substance, followed by mixing and implementing the mill run 8-12 times to obtain a mix feed.

(4) Curing and foaming the mix feed obtained in Step 3 in a curing press at a temperature of 165° C.~185° C. and a molding pressure of 5~20 MPa for 3-20 min, followed by discharge and cooling to obtain the rubber foam oil-absorbing material.

Compared with the prior art, in the invention, (1) The rubber foam oil-absorbing material uses the mixture of the natural rubber and butadiene rubber as the matrix, which is low in cost and has higher oil-absorption rate. The rate of oil-absorption from dimethylbenzene by the rubber foam oil-absorbing material can reach 48.6 g/g, and the rate of oil-absorption from dimethylbenzene is also above 30 g/g. Meanwhile, the prepared rubber foam oil-absorbing material has a porous structure, can quickly absorb the oil and save the oil in the pores of the rubber network structure, thus fulfilling the aim of oil preservation. The rubber foam oil-absorbing material of the present invention has a high oil-absorption rate and high oil preservation performance.

(2) The preparation method of the present invention is simple, and is convenient to realize industrial production.

DETAILED DESCRIPTION OF THE PREFERRED EMBODIMENT

Figure 1:
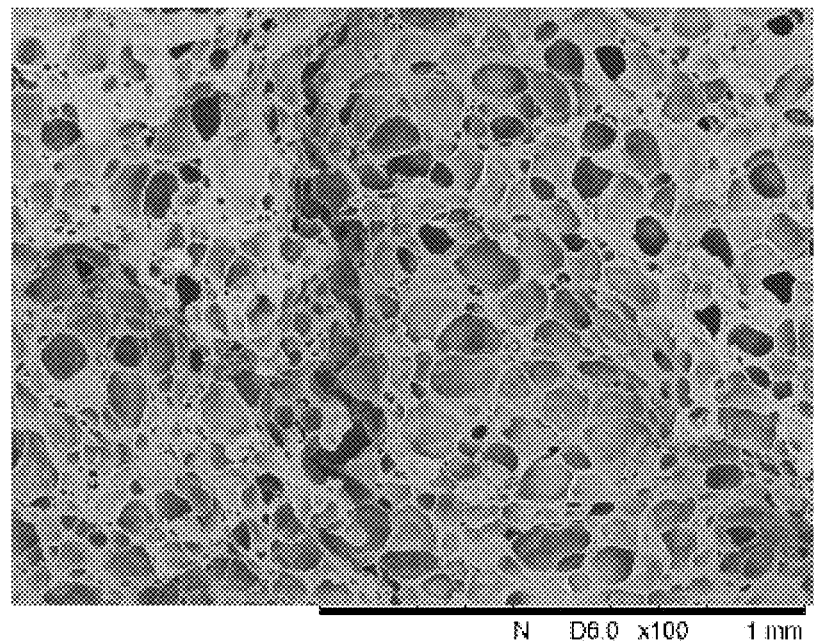
FIG. 1 is an electron micrograph of the rubber foam oil-absorbing material in accordance with the first embodiment of the present invention.

To enable a further understanding of the innovative and technological content of the invention herein refer to the detailed description of the invention and the accompanying drawings below:

Embodiment 1

The rubber foam oil-absorbing material in this embodiment comprises the following components in weight:
   90 parts of natural rubber
   10 parts of butadiene rubber
   4 parts of N,N'-dinitroso pentamethylene tetramine
   4 parts of 4'4-oxydibenzenesulfonyl hydrazide
   1 parts of sodium hydrogen bicarbonate
   0.3 parts of diphenyl guanidine
   0.5 parts of zinc dimethyl dithiocarbamate
   0.4 parts of 2,2'-dithio-dibenzo thiazole
   0.3 parts of tetramethyl thiuram disulfide
   5 parts of zinc oxide
   2 parts of stearic acid, and
   1 part of sulfur The method for preparing the rubber foam oil-absorbing material in this embodiment comprises the following steps:

(1) Milling 90 parts of natural rubber and 10 parts of butadiene rubber in an open mill at a roll temperature of 50° C. for 10 min, then sequentially adding 4 parts of N,N-dinitroso pentamethylene tetramine, 4 parts of 4,4'-oxydibenzenesulfonyl hydrazide, 1 part of sodium bicarbonate, 0.3 parts of diphenyl guanidine, 0.5 parts of zinc dimethyl dithiocarbamate, 0.4 parts of 2,2'-dithio-dibenzo thiazole and 0.3 parts of tetramethyl thiuram disulfide, followed by milling for 3 min to obtain a Step 1 substance.

(2) Adding 5 parts of zinc oxide and 2 parts of stearic acid into the Step 1 substance, followed by milling for 5 min to obtain a Step 2 substance.

(3) Adding 1 part of sulfur into the Step 2 substance, followed by mixing and implementing the mill run 10 times to obtain a mix feed.

(4) Curing and foaming the mix feed obtained in Step 3 in a curing press at a temperature of 165° C. and a molding pressure of 5 MPa for 3 min, followed by discharge and cooling to obtain the rubber foam oil-absorbing material.

0.1 g rubber foam oil-absorbing material prepared in this embodiment is weighed, placed in a stainless steel mesh (4 cm×4 cm×2 cm) and put into a 100 ml flat-bottom breaker. Excessive oil is added. After the oil-absorption is saturated, the oil-absorbing material is taken out, and the solvent on the material surface is removed with a filter paper, followed by accurate weighing. The oil-absorbing rate is calculated according to the following formula:

$$\text{Oil-absorption rate } Q \text{ (g/g)} = (\text{weight of sample after oil-absorption} - \text{weight of sample before oil-absorption})/\text{weight of sample before oil-absorption}$$

The gasoline absorption rate of the rubber foam oil-absorbing material in this embodiment reaches 35.5 g/g, and the dimethylbenzene absorption rate reaches 48.6 g/g, and the absorption time is 60 min.

FIG. 1 is an electron micrograph of the rubber foam oil-absorbing material prepared in this embodiment. When the rubber foam oil-absorbing material is soaked in the oil product, the rubber well interact with the oil product to absorb the oil product. One part of the rubber foam oil-absorbing material prepared is porous, and the oil molecules can quickly enter the mesh structure of the rubber, so the rubber foam oil-absorbing material prepared in this embodiment achieves the effect of high oil-absorption speed and high oil preservation performance.

Embodiment 2

The rubber foam oil-absorbing material in this embodiment comprises the following components in weight:
   70 parts of natural rubber
   30 parts of butadiene rubber
   8 parts of N,N'-dinitroso pentamethylene tetramine
   1 part of 4'4-oxydibenzenesulfonyl hydrazide
   1 part of sodium hydrogen bicarbonate
   0.8 parts of diphenyl guanidine
   0.2 parts of zinc dimethyl dithiocarbamate
   0.5 parts of 2,2'-dithio-dibenzo thiazole
   0.1 parts of tetramethyl thiuram disulfide
   3 parts of zinc oxide
   3 parts of stearic acid, and
   1 part of sulfur.

The method for preparing the rubber foam oil-absorbing material in this embodiment comprises the following steps:

(1) Milling 70 parts of natural rubber and 30 parts of butadiene rubber in an open mill at a roll temperature of 52° C. for 11 min, then sequentially adding 8 parts of N,N-dinitroso pentamethylene tetramine, 1 part of 4,4'-oxydibenzenesulfonyl hydrazide, 1 part of sodium bicarbonate, 0.8 parts of diphenyl guanidine, 0.2 parts of zinc dimethyl dithiocarbamate, 0.5 parts of 2,2'-dithio-dibenzo thiazole and 0.1 parts of tetramethyl thiuram disulfide, followed by milling for 3 min to obtain a Step 1 substance.

(2) Adding 3 parts of zinc oxide and 3 parts of stearic acid into the Step 1 substance, followed by milling for 3 min to obtain a Step 2 substance.

(3) Adding 1 part of sulfur into the Step 2 substance, followed by mixing and implementing the mill run 9 times to obtain a mix feed.

(4) Curing and foaming the mix feed obtained in Step 3 in a curing press at a temperature of 170° C. and a molding pressure of 10 MPa for 6 min, followed by discharge and cooling to obtain the rubber foam oil-absorbing material.

0.1 g rubber foam oil-absorbing material prepared in this embodiment is weighed, placed in a stainless steel mesh (4 cm×4 cm×2 cm) and put into a 100 ml flat-bottom breaker. Excessive oil is added. After the oil-absorption is saturated, the oil-absorbing material is taken out, and the solvent on the material surface is removed with a filter paper, followed by accurate weighing. The oil-absorbing rate is calculated according to the following formula:

Oil-absorption rate $Q$ (g/g)=(weight of sample after oil-absorption−weight of sample before oil-absorption)/weight of sample before oil-absorption The gasoline absorption rate of the rubber foam oil-absorbing material in this embodiment reaches 31.3 g/g, the dimethylbenzene absorption rate reaches 46.1 g/g, and the absorption time is 60 min.

Figure 2:
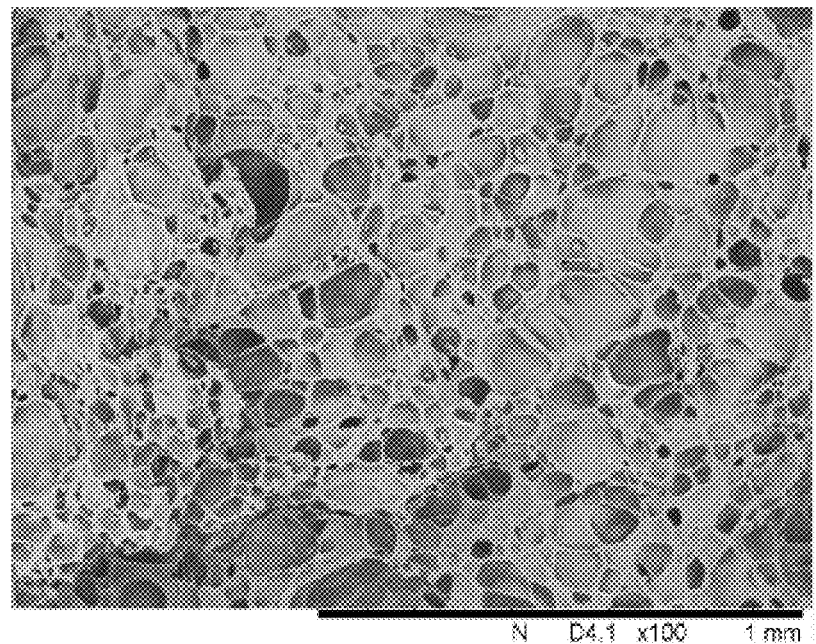
FIG. 2 is an electron micrograph of the rubber foam oil-absorbing material in accordance with the second embodiment of the present invention.

FIG. 2 is an electron micrograph of the rubber foam oil-absorbing material prepared in this embodiment. When the rubber foam oil-absorbing material is soaked in the oil product, the rubber well interact with the oil product to absorb the oil product. One part of the rubber foam oil-absorbing material prepared is porous, and the oil molecules can quickly enter the mesh structure of the rubber, so the rubber foam oil-absorbing material prepared in this embodiment achieves the effect of high oil-absorption speed and high oil preservation performance.

Embodiment 3

The rubber foam oil-absorbing material in this embodiment comprises the following components in weight:
  50 parts of natural rubber
  50 parts of butadiene rubber
  5 parts of N,N'-dinitroso pentamethylene tetramine
  2 parts of 4'4-oxydibenzenesulfonyl hydrazide
  1 part of sodium hydrogen bicarbonate
  0.5 parts of diphenyl guanidine
  0.5 parts of zinc dimethyl dithiocarbamate
  0.3 parts of 2,2'-dithio-dibenzo thiazole
  0.2 parts of tetramethyl thiuram disulfide
  5 parts of zinc oxide
  1 part of stearic acid, and
  1 part of sulfur.

The method for preparing the rubber foam oil-absorbing material in this embodiment comprises the following steps:

(1) Milling 50 parts of natural rubber and 50 parts of butadiene rubber in an open mill at a roll temperature of 54° C. for 13 min, then sequentially adding 5 parts of N,N-dinitroso pentamethylene tetramine, 2 parts of 4,4'-oxydibenzenesulfonyl hydrazide, 1 part of sodium bicarbonate, 0.5 parts of diphenyl guanidine, 0.5 parts of zinc dimethyl dithiocarbamate, 0.3 parts of 2,2'-dithio-dibenzo thiazole and 0.2 parts of tetramethyl thiuram disulfide, followed by milling for 5 min to obtain a Step 1 substance.

(2) Adding 5 parts of zinc oxide and 1 part of stearic acid into the Step 1 substance, followed by milling for 5 min to obtain a Step 2 substance.

(3) Adding 1 part of sulfur into the Step 2 substance, followed by mixing and implementing the mill run 11 times to obtain a mix feed.

(4) Curing and foaming the mix feed obtained in Step 3 in a curing press at a temperature of 175° C. and a molding pressure of 15 MPa for 10 min, followed by discharge and cooling to obtain the rubber foam oil-absorbing material.

0.1 g rubber foam oil-absorbing material prepared in this embodiment is weighed, placed in a stainless steel mesh (4 cm×4 cm×2 cm) and put into a 100 ml flat-bottom breaker. Excessive oil is added. After the oil-absorption is saturated, the oil-absorbing material is taken out, and the solvent on the material surface is removed with a filter paper, followed by accurate weighing. The oil-absorbing rate is calculated according to the following formula:

Oil-absorption rate $Q$ (g/g)=(weight of sample after oil-absorption−weight of sample before oil-absorption)/weight of sample before oil-absorption When the rubber foam oil-absorbing material is soaked in the oil product, the rubber well interact with the oil product to absorb the oil product. One part of the rubber foam oil-absorbing material prepared is porous, and the oil molecules can quickly enter the mesh structure of the rubber, so the rubber foam oil-absorbing material prepared in this embodiment achieves the effect of high oil-absorption speed and high oil preservation performance. The gasoline absorption rate of the rubber foam oil-absorbing material in this embodiment reaches 30.5 g/g, the dimethylbenzene absorption rate reaches 43.5 g/g, and the absorption time is 60 min.

Embodiment 4

The rubber foam oil-absorbing material in this embodiment comprises the following components in weight:
  30 parts of natural rubber
  70 parts of butadiene rubber
  7 parts of N,N'-dinitroso pentamethylene tetramine
  5 parts of 4'4-oxydibenzenesulfonyl hydrazide
  3 parts of sodium hydrogen bicarbonate
  0.8 parts of diphenyl guanidine
  0.5 parts of zinc dimethyl dithiocarbamate
  0.1 parts of 2,2'-dithio-dibenzo thiazole
  0.1 parts of tetramethyl thiuram disulfide
  5 parts of zinc oxide
  3 parts of stearic acid, and
  1.5 parts of sulfur.

The method for preparing the rubber foam oil-absorbing material in this embodiment comprises the following steps:

(1) Milling 30 parts of natural rubber and 70 parts of butadiene rubber in an open mill at a roll temperature of 53° C. for 11 min, then sequentially adding 7 parts of N,N-dinitroso pentamethylene tetramine, 5 parts of 4,4'-oxydibenzenesulfonyl hydrazide, 3 parts of sodium bicarbonate, 0.8 parts of diphenyl guanidine, 0.5 parts of zinc dimethyl dithiocarbamate, 0.1 parts of 2,2'-dithio-dibenzo thiazole and 0.1 parts of tetramethyl thiuram disulfide, followed by milling for 4 min to obtain a Step 1 substance.

(2) Adding 5 parts of zinc oxide and 3 parts of stearic acid into the Step 1 substance, followed by milling for 4 min to obtain a Step 2 substance.

(3) Adding 1.5 parts of sulfur into the Step 2 substance, followed by mixing and implementing the mill run 8 times to obtain a mix feed.

(4) Curing and foaming the mix feed obtained in Step 3 in a curing press at a temperature of 180° C. and a molding pressure of 20 MPa for 15 min, followed by discharge and cooling to obtain the rubber foam oil-absorbing material.

0.1 g rubber foam oil-absorbing material prepared in this embodiment is weighed, placed in a stainless steel mesh (4 cm×4 cm×2 cm) and put into a 100 ml flat-bottom breaker. Excessive oil is added. After the oil-absorption is saturated, the oil-absorbing material is taken out, and the solvent on the material surface is removed with a filter paper, followed by accurate weighing. The oil-absorbing rate is calculated according to the following formula:

Oil-absorption rate $Q$ (g/g)=(weight of sample after oil-absorption−weight of sample before oil-absorption)/weight of sample before oil-absorption When the rubber foam oil-absorbing material is soaked in the oil product, the rubber well interact with the oil product to absorb the oil product. One part of the rubber foam oil-absorbing material prepared is porous, and the oil molecules can quickly enter the mesh structure of the rubber, so the rubber foam oil-absorbing material prepared in this embodiment achieves the effect of high oil-absorption speed and high oil preservation performance. The gasoline absorption rate of the rubber foam oil-absorbing material in this embodiment reaches 31.5 g/g, the dimethylbenzene absorption rate reaches 43.7 g/g, and the absorption time is 60 min.

Embodiment 5

The rubber foam oil-absorbing material in this embodiment comprises the following components in weight:
90 parts of natural rubber
10 parts of butadiene rubber
6 parts of N,N'-dinitroso pentamethylene tetramine
4 parts of 4'4-oxydibenzenesulfonyl hydrazide
6 parts of sodium hydrogen bicarbonate
0.7 parts of diphenyl guanidine
0.4 parts of zinc dimethyl dithiocarbamate
0.4 parts of 2,2'-dithio-dibenzo thiazole
0.1 parts of tetramethyl thiuram disulfide
5 parts of zinc oxide
3 parts of stearic acid, and
0.5 part of sulfur.

The method for preparing the rubber foam oil-absorbing material in this embodiment comprises the following steps:

(1) Milling 90 parts of natural rubber and 10 parts of butadiene rubber in an open mill at a roll temperature of 51° C. for 12 min, then sequentially adding 6 parts of N,N-dinitroso pentamethylene tetramine, 4 parts of 4,4'-oxydibenzenesulfonyl hydrazide, 6 parts of sodium bicarbonate, 0.7 parts of diphenyl guanidine, 0.4 parts of zinc dimethyl dithiocarbamate, 0.4 parts of 2,2'-dithio-dibenzo thiazole and 0.1 parts of tetramethyl thiuram disulfide, followed by milling for 3 min to obtain a Step 1 substance.

(2) Adding 5 parts of zinc oxide and 3 parts of stearic acid into the Step 1 substance, followed by milling for 5 min to obtain a Step 2 substance.

(3) Adding 0.5 part of sulfur into the Step 2 substance, followed by mixing and implementing the mill run 12 times to obtain a mix feed.

(4) Curing and foaming the mix feed obtained in Step 3 in a curing press at a temperature of 185° C. and a molding pressure of 20 MPa for 18 min, followed by discharge and cooling to obtain the rubber foam oil-absorbing material.

0.1 g rubber foam oil-absorbing material prepared in this embodiment is weighed, placed in a stainless steel mesh (4 cm×4 cm×2 cm) and put into a 100 ml flat-bottom breaker. Excessive oil is added. After the oil-absorption is saturated, the oil-absorbing material is taken out, and the solvent on the material surface is removed with a filter paper, followed by accurate weighing. The oil-absorbing rate is calculated according to the following formula:

Oil-absorption rate $Q$ (g/g)=(weight of sample after oil-absorption−weight of sample before oil-absorption)/weight of sample before oil-absorption When the rubber foam oil-absorbing material is soaked in the oil product, the rubber well interact with the oil product to absorb the oil product. One part of the rubber foam oil-absorbing material prepared is porous, and the oil molecules can quickly enter the mesh structure of the rubber, so the rubber foam oil-absorbing material prepared in this embodiment achieves the effect of high oil-absorption speed and high oil preservation performance. The gasoline absorption rate of the rubber foam oil-absorbing material in this embodiment reaches 31.7 g/g, the dimethylbenzene absorption rate reaches 42.9 g/g, and the absorption time is 60 min.

Embodiment 6

The rubber foam oil-absorbing material in this embodiment comprises the following components in weight:
90 parts of natural rubber
10 parts of butadiene rubber
4 parts of N,N'-dinitroso pentamethylene tetramine
1 part of 4'4-oxydibenzenesulfonyl hydrazide
2 parts of sodium hydrogen bicarbonate
0.6 parts of diphenyl guanidine
0.2 parts of zinc dimethyl dithiocarbamate
0.1 parts of 2,2'-dithio-dibenzo thiazole
0.2 parts of tetramethyl thiuram disulfide
4 parts of zinc oxide
3 parts of stearic acid, and
1.5 parts of sulfur.

The method for preparing the rubber foam oil-absorbing material in this embodiment comprises the following steps:

(1) Milling 90 parts of natural rubber and 10 parts of butadiene rubber in an open mill at a roll temperature of 55° C. for 13 min, then sequentially adding 4 parts of N,N-dinitroso pentamethylene tetramine, 1 part of 4,4'-oxydibenzenesulfonyl hydrazide, 2 parts of sodium bicarbonate, 0.6 parts of diphenyl guanidine, 0.2 parts of zinc dimethyl dithiocarbamate, 0.1 parts of 2,2'-dithio-dibenzo thiazole and 0.2 parts of tetramethyl thiuram disulfide, followed by milling for 4 min to obtain a Step 1 substance.

(2) Adding 4 parts of zinc oxide and 3 parts of stearic acid into the Step 1 substance, followed by milling for 3 min to obtain a Step 2 substance.

(3) Adding 1.5 parts of sulfur into the Step 2 substance, followed by mixing and implementing the mill run 10 times to obtain a mix feed.

(4) Curing and foaming the mix feed obtained in Step 3 in a curing press at a temperature of 185° C. and a molding pressure of 20 MPa for 20 min, followed by discharge and cooling to obtain the rubber foam oil-absorbing material.

0.1 g rubber foam oil-absorbing material prepared in this embodiment is weighed, placed in a stainless steel mesh (4 cm×4 cm×2 cm) and put into a 100 ml flat-bottom breaker. Excessive oil is added. After the oil-absorption is saturated, the oil-absorbing material is taken out, and the solvent on the material surface is removed with a filter paper, followed by accurate weighing. The oil-absorbing rate is calculated according to the following formula:

Oil-absorption rate $Q$ (g/g)=(weight of sample after oil-absorption−weight of sample before oil-absorption)/weight of sample before oil-absorption When the rubber foam oil-absorbing material is soaked in the oil product, the rubber well interact with the oil product to absorb the oil product. One part of the rubber foam oil-absorbing material prepared is porous, and the oil molecules can quickly enter the mesh structure of the rubber, so the rubber foam oil-absorbing material prepared in this embodiment achieves the effect of high oil-absorption speed and high oil preservation performance. The gasoline absorption rate of the rubber foam oil-absorbing material in this embodiment reaches 33.7 g/g, the dimethylbenzene absorption rate reaches 44.9 g/g, and the absorption time is 60 min.

The invention claimed is:

1. A rubber foam oil-absorbing material, comprising the following components in weight:
   100 parts of a mixture of natural rubber and butadiene rubber,
   4-8 parts of N, N-dinitroso pentamethylene tetramine,
   1-8 parts of 4,4'-oxydibenzenesulfonyl hydrazide,
   1-6 parts of sodium bicarbonate,
   0.3-0.8 part of diphenyl guanidine,
   0.2-0.5 part of zinc dimethyl dithiocarbamate,
   0.1-0.5 part of 2,2'-dithio-dibenzo thiazole,
   0.1-0.3 part of tetramethyl thiuram disulfide,
   3-5 parts of zinc oxide,
   1-3 parts of stearic acid, and
   0.5-1.5 parts of sulfur.

2. The rubber foam oil-absorbing material of claim 1, wherein the natural rubber accounts for 30%-90% of the weight of the mixture of the natural rubber and butadiene rubber.

3. A method for preparing the rubber foam oil-absorbing material of claim 1, comprising following steps:
   Step 1: milling 100 parts of the mixture of the natural rubber and butadiene rubber in an open mill at a roll temperature of 45° C.~55° C. for 10 min, then sequentially adding 4-8 parts of N,N-dinitroso pentamethylene tetramine, 1-8 parts of 4,4'-oxydibenzenesulfonyl hydrazide, 1-6 parts of sodium bicarbonate, 0.3-0.8 parts of diphenyl guanidine, 0.2-0.5 parts of zinc dimethyl dithiocarbamate, 0.1-0.5 parts of 2,2'-dithio-dibenzo thiazole and 0.1-0.3 parts of tetramethyl thiuram disulfide, followed by milling for 3-5 min to obtain a Step 1 substance;
   Step 2: adding 3-5 parts of zinc oxide and 1-3 parts of stearic acid into the Step 1 substance, followed by milling for 3-5 min to obtain a Step 2 substance;
   Step 3: adding 0.5-1.5 parts of sulfur into the Step 2 substance, followed by mixing and implementing the mill run 8-12 times to obtain a mix feed;
   Step: 4 curing and foaming the mix feed obtained in Step 3 in a curing press at a temperature of 165° C.~185° C. and a molding pressure of 5~19 MPa for 2-20 min, followed by discharge and cooling to obtain the rubber foam oil-absorbing material.

* * * * *